US009383995B2

(12) United States Patent
Kanapathipillai et al.

(10) Patent No.: US 9,383,995 B2
(45) Date of Patent: Jul. 5, 2016

(54) LOAD ORDERING IN A WEAKLY-ORDERED PROCESSOR

(71) Applicant: Apple Inc., Cupertino, CA (US)

(72) Inventors: Pradeep Kanapathipillai, Santa Clara, CA (US); Hari Kannan, Sunnyvale, CA (US); Po-Yung Chang, Saratoga, CA (US); Ming-Ta Hsu, Sunnyvale, CA (US); Rajat Goel, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 722 days.

(21) Appl. No.: 13/750,972

(22) Filed: Jan. 25, 2013

(65) Prior Publication Data

US 2014/0215191 A1  Jul. 31, 2014

(51) Int. Cl.
  *G06F 9/30* (2006.01)
  *G06F 13/00* (2006.01)
  *G06F 9/38* (2006.01)

(52) U.S. Cl.
  CPC .......... *G06F 9/30043* (2013.01); *G06F 9/3834* (2013.01)

(58) Field of Classification Search
  None
  See application file for complete search history.

(56) References Cited

U.S. PATENT DOCUMENTS

| | | | |
|---|---|---|---|
| 5,751,986 A | 5/1998 | Fetterman et al. | |
| 5,881,264 A | 3/1999 | Kurosawa | |
| 6,334,172 B1 * | 12/2001 | Arimilli | G06F 12/0815 711/122 |
| 6,349,361 B1 * | 2/2002 | Altman | G06F 9/3834 711/121 |
| 6,701,416 B1 * | 3/2004 | Arimilli | G06F 12/0811 711/141 |
| 7,454,570 B2 | 11/2008 | Dunshea et al. | |
| 7,627,721 B2 * | 12/2009 | Hass | H04L 49/00 709/251 |
| 7,805,392 B1 * | 9/2010 | Steele | G06F 17/30982 706/48 |
| 8,024,522 B1 * | 9/2011 | Favor | G06F 9/3004 711/118 |
| 8,762,951 B1 * | 6/2014 | Kosche | G06F 11/3476 717/127 |
| 9,213,652 B1 * | 12/2015 | Miao | G06F 12/10 |
| 2002/0112129 A1 * | 8/2002 | Arimilli | G06F 12/0848 711/141 |
| 2006/0218358 A1 | 9/2006 | Hofmann et al. | |
| 2009/0138683 A1 * | 5/2009 | Capps, Jr. | G06F 9/30101 712/220 |
| 2010/0037027 A1 * | 2/2010 | Prudvi | G06F 12/0893 711/141 |
| 2012/0260042 A1 * | 10/2012 | Henry | G06F 9/22 711/125 |
| 2012/0260071 A1 * | 10/2012 | Henry | G06F 9/30123 712/216 |
| 2012/0260074 A1 * | 10/2012 | Henry | G06F 9/30174 712/225 |

* cited by examiner

*Primary Examiner* — Michael Sun
(74) *Attorney, Agent, or Firm* — Meyertons, Hood, Kivlin, Kowert & Goetzel, P.C.

(57) ABSTRACT

Techniques are disclosed relating to ordering of load instructions in a weakly-ordered memory model. In one embodiment, a processor includes a cache with multiple cache lines and a store queue configured to maintain status information associated with a store instruction that targets a location in one of the cache lines. In this embodiment, the processor is configured to set an indicator in the status information in response to migration of the targeted cache line. The indicator may be usable to sequence performance of load instructions that are younger than the store instruction. For example, the processor may be configured to wait, based on the indicator, to perform a younger load instruction that targets the same location as the store instruction until the store instruction is removed from the store queue. This may prevent forwarding of the value of the store instruction to the younger load and preserve load-load ordering.

20 Claims, 8 Drawing Sheets

300

Maintain status information in a store queue. The status information is associated with a store instruction in the store queue that targets a location on a particular cache line
310

Set an indicator in the status information in response to migration of the particular cache line
320

Speculatively execute a load instruction using data from a location in a particular cache line
360

Set an indicator in status information associated with the load instruction in response to migration of the cache line. The status information is maintained in the load queue
370

FIG. 3B

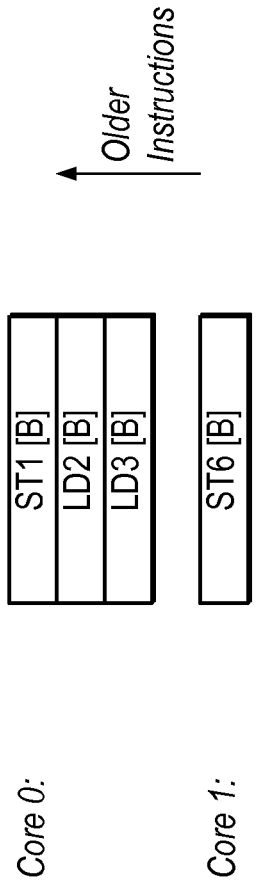

Core 0:

Core 1:

↑ Older Instructions

Example load-vs.-load rule violation 410:
- ST1 writes "old" data to core 0 data cache line X, waits in store queue
- Core 0 data cache line X is migrated
- ST6 writes "new" data to core 1 data cache line X
- Cache line X with "new" data brought into core 0 data cache
- LD3 reads (forwards) "old" data from ST1
- ST1 dequeues
- LD2 reads "new" data from core 0 data cache – violates rule because older load (LD2) reads newer data from same location (B) than younger load (LD3)

Solution 420:
- ST1 writes "old" data to core 0 data cache line X, waits in store queue
- Core 0 data cache line X is migrated based on ST6
- ST1 marked as poisoned due to eviction
- ST6 writes "new" data to core 1 data cache line X
- Cache line X with "new" data brought into core 0 data cache
- LD3 waits to perform based on poisoned indication
- ST1 dequeues
- LD3 reads "new" data from core 0 data cache
- LD2 reads "new" data from core 0 data cache – does not violate rule

FIG. 4A

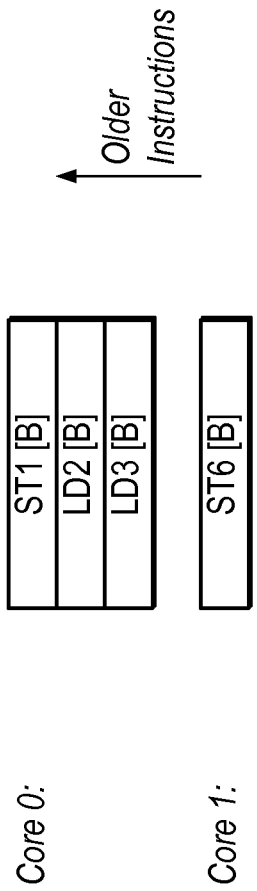

Core 0:

| ST1 [B] |
| LD2 [B] |
| LD3 [B] |

Core 1:

| ST6 [B] |

↓ Older Instructions

Example load-vs.-load rule violation 430:
- ST1 writes "old" data to core 0 data cache line X, waits in store queue
- LD3 reads (forwards) "old" data from ST1
- Core 0 data cache line X is migrated
- ST6 writes "new" data to core 1 data cache line X
- Cache line X with "new" data brought into core 0 data cache
- ST1 dequeues
- LD2 reads "new" data from core 0 data cache – violates rule because older load (LD2) reads newer data from same location (B) than younger load (LD3)

Solution 440:
- ST1 writes "old" data to core 0 data cache line X, waits in store queue
- LD3 reads (forwards) "old" data from ST1
- Core 0 data cache line X is migrated based on ST6
- <u>ST1 and LD3 marked poisoned due to eviction</u>
- ST6 writes "new" data to core 1 data cache line X
- Cache line X with "new" data brought into core 0 data cache
- ST1 dequeues
- LD2 reads "new" data from core 0 data cache
- <u>LD2 causes younger poisoned loads (LD3) to be retried. LD3 gets "new" data from core 0 data cache</u>

*FIG. 4B*

LOAD ORDERING IN A WEAKLY-ORDERED PROCESSOR

RELATED APPLICATIONS

The present application is related to U.S. application Ser. No. 13/750,942 entitled "Completing Load and Store Instructions in a Weakly-Ordered Memory Model", which is incorporated herein by reference in its entirety.

BACKGROUND

1. Technical Field

This disclosure relates to microprocessors, and more particularly to techniques for ordering loads with respect to other loads in a weakly-ordered out-of-order processor.

2. Description of the Related Art

Modern out-of-order processors are often configured to execute load and store instructions out-of-order, and also permit loads to access memory in a speculative manner. Speculatively-executed loads and stores are typically held in queues until necessary criteria is met to make the loads and stores architecturally visible (i.e., visible to software). In a multi-processor environment, the order rules of memory accesses by various processors is defined by the memory consistency model specified by a given instruction set architecture (ISA). The weakly-ordered model is one such memory consistency model.

The "load-load" ordering rule is one common requirement of even weakly-ordered models. Loads to the same memory address must be ordered with respect to each other, such that a younger load instruction never reads an "older" value of data from a given memory address when an older load to the same address reads a "newer" value.

SUMMARY

Techniques are disclosed herein relating to load ordering in a weakly-ordered, out-of-order processor. Some of the techniques disclosed herein are particularly relevant in a multi-processor/multi-core environments.

In one embodiment, a processor includes a cache with multiple cache lines and a store queue configured to maintain status information associated with a store instruction that targets a location in one of the cache lines. In this embodiment, the processor is configured to set an indicator in the status information in response to migration of the targeted cache line. The indicator may be usable to sequence performance of load instructions that are younger than the store instruction. For example, the processor may be configured to wait, based on the indicator, to perform a younger load instruction that targets the same location as the store instruction until the store instruction is removed from the store queue. This may prevent forwarding of the value of the store instruction to the younger load, which may in turn prevent violation of the load-load ordering rule. In this embodiment, when the store instruction is initially received at a load/store unit, the processor may be configured to retry one or more load instructions in a load queue that are younger than the store instruction and that target the same location.

In another embodiment, a processor includes a cache with multiple cache lines and a load queue configured to maintain status information associated with a load instruction that targets a location in one of the cache lines. In this embodiment, the processor is configured to set an indicator in the status information in response to migration of the targeted cache line. The load instruction may be speculatively performed. The indicator may be usable to sequence performance the load instruction and one or more other instructions. For example, the processor may be configured to flush and retry the load instruction in response to an older load instruction and the indicator. The may prevent violations of the load-load ordering rule while allowing flexibility in speculatively executing load instructions.

Cache line migrations may be caused by instructions running on a different processing core than a core executing the load and store instructions. A coherency unit may be configured to migrate cache lines to maintain coherency among various caches in a cache hierarchy. Migration of a cache line may include eviction or invalidation of the cache line.

BRIEF DESCRIPTION OF THE DRAWINGS

FIG. 3A is a flow diagram illustrating one embodiment of a method for indicating a poisoned store instruction;

FIG. 3B is a flow diagram illustrating one embodiment of a method for indicating a poisoned load instruction;

FIG. 4A is a diagram illustrating exemplary processing of load and store instructions; and FIG. 4B is another diagram illustrating exemplary processing of load and store instructions.

Figure 1A:
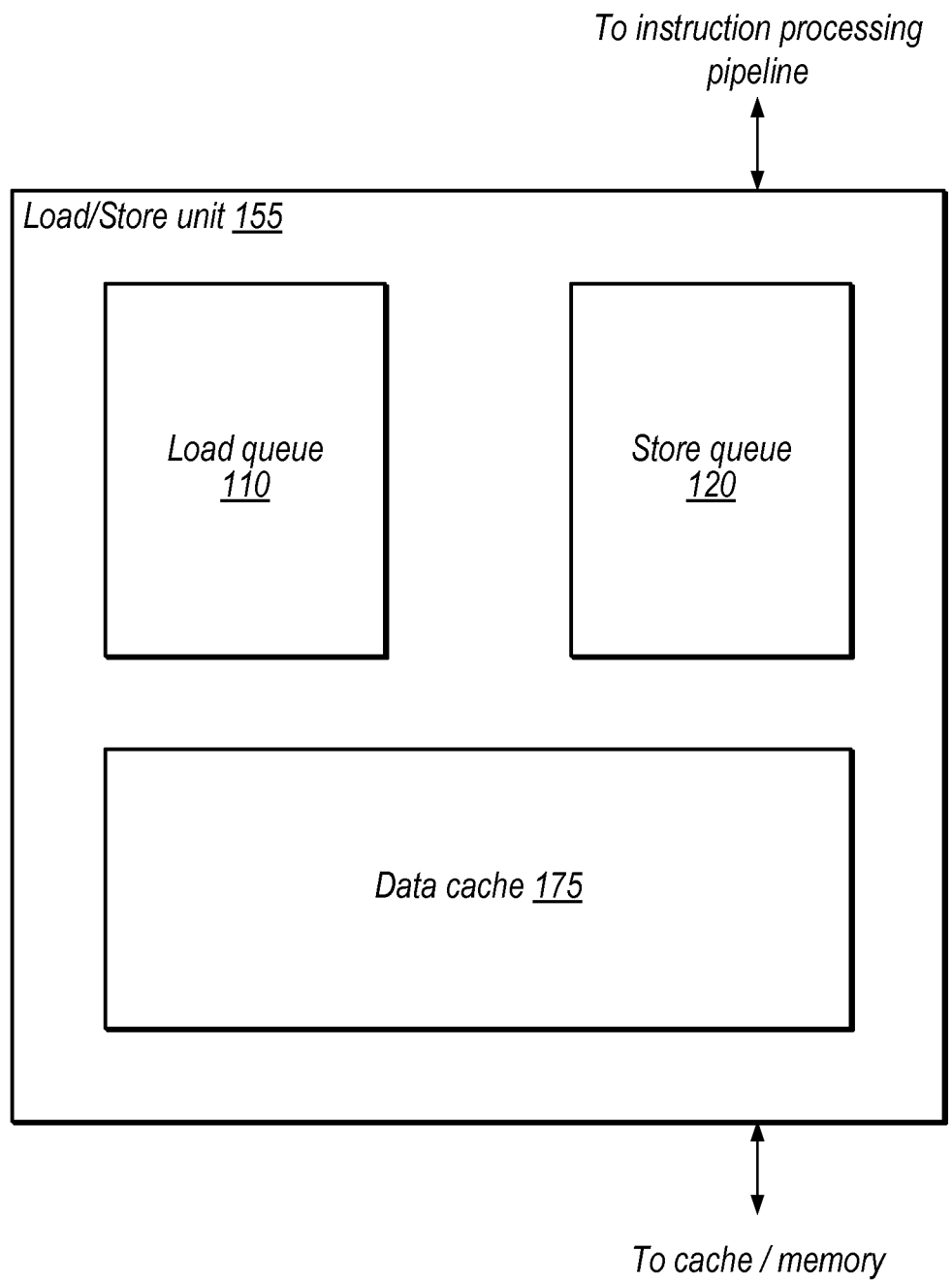
FIG. 1A is a block diagram illustrating one embodiment of a load/store unit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The load-load ordering rule is a common memory system requirement. Loads to the same memory address must be ordered with respect to each other, such that a younger load instruction never reads an "older" value of data from a given memory address when an older load to the same address reads a "newer" value.

As used herein, the terms "older" and "younger" refer to relative ages of instructions in an instruction stream. Said another way, older instructions precede younger instructions in program order. For example, in the instruction stream of FIG. 4A, LD2 is older than LD3 but younger than ST1. Further, "older" data refers to data associated with a relatively older instruction while "newer" data refers to data associated with a relatively younger instruction. For example, an older store may be described as having written old data to a particular location when a younger store writes new data to the particular location.

Related U.S. patent application Ser. No. 13/750,942 noted above describes techniques for probing for relatively older/younger load/store instructions within and between load and store queues. Various embodiments described herein may utilize these techniques to determine relative age among load/store instructions. In other embodiments, other methodologies may be used to determine relative instruction age.

Modern microprocessors often include multiple levels of caches, as well as circuitry configured to maintain coherence among these distributed caches. Often, a processor core uses a "snoop" mechanism to enforce coherency. Snoops are requests sent from one cache (the "requesting cache") to another cache (the "target cache) to migrate (i.e., invalidate or evict) a cache line from the target cache so that the requesting cache can write the cache line. In some embodiments, a snoop may indicate whether the cache line should be invalidated or evicted. A processor may be configured to replay speculatively-executed loads from migrated cache lines.

However, in some embodiments, snoops are filtered and sent only to processing cores whose caches contain the cache line associated with a given snoop. For example, a processor may filter snoops using a reverse dictionary of L1 tags in an L2 cache coherency unit. Thus, if a load is speculatively executed using data from a cache line and the cache line is subsequently migrated without retrying the load, a later write to the cache line may not be detected (the snoop would be filtered and not sent to that processing core) and the load-load ordering rule may be violated. A similar problem may occur when a cache line targeted by a store instruction is migrated in embodiments where load instructions can forward data from store instructions. More detailed examples of these problems are provided below in FIGS. 4A and 4B. In various embodiments, a "poison" indicator is implemented to mark loads and stores that are associated with migrated cache lines in some situations.

As used herein, the term "migrate" in the context of a cache line refers to eviction or invalidation of the cache line. For example, a processing element may evict a cache line to make room for another cache line at the same index. The processing element may perform such evictions based on a least-recently used (LRU) scheme, for example. As another example, a processing element may invalidate or evict a cache line based on another processor core snooping the cache line. Invalidating a cache line may include marking the cache line invalid according to a coherency protocol such as the MESI protocol, for example.

Referring now to FIG. 1A, a block diagram illustrating one embodiment of a load/store unit (LSU) 155 in a processor is shown. In the illustrated embodiment, LSU 155 includes load queue 110, store queue 120, and data cache 175. In the illustrated embodiment, LSU 155 is configured to receive instruction information from an instruction processing pipeline (of which LSU 155 may be considered a part) and is coupled to a higher-level cache (relative to data cache 175) and/or a memory.

In one embodiment, load queue 110 includes multiple entries and is configured to store information associated with load instructions. Load instructions stored in load queue 110 may be speculatively executed. Each entry in load queue 110 may include: address information corresponding to the target location of a load, data associated with the load, and status information, for example.

Store queue 120 may similarly include multiple entries configured to store information associated with store instructions. Store instructions stored in store queue 120 may be posted loads. Posted stores may be retired from a completion unit of a processor, but may reside in store queue 120 while waiting to actually commit their data. Each entry in a store queue 120 may include: address information corresponding to the target location of a store, data associated with the store, and status information, for example.

Load queue 110 and store queue 120 may be configured to queue instructions in program order. However, load and store instructions may be executed out of program order earlier in the processing pipeline. As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

Data cache 175 may be a level 1 (L1) data cache, for example. Data cache 175 may be a write-back or write-through cache. Data cache 175 may include a plurality of cache indices and ways. Data cache 175 may be indexed using index bits of a memory address and a matching way may be determined using tag bits of a memory address. Data cache 175 may be physically indexed and physically tagged, virtually indexed and virtually tagged, or virtually indexed and physically tagged. In some embodiments, LSU 155 is configured to attempt to forward data from stores in store queue 120 to younger loads in load queue 110 before obtaining the data from data cache 175. For example, if an older store ST_old targets the same location as a younger load LD_young, data from the store queue entry for ST_old may be forwarded for performance of LD_young. LSU 155 may be configured to fetch data from a higher-level cache or memory when there is a cache miss in data cache 175. LSU 155 may also be configured to maintain coherency with other processor cores. For example, when another processor core writes to a cache line that is resident in data cache 175, LSU 155 may evict or invalidate the cache line.

Figure 1B:
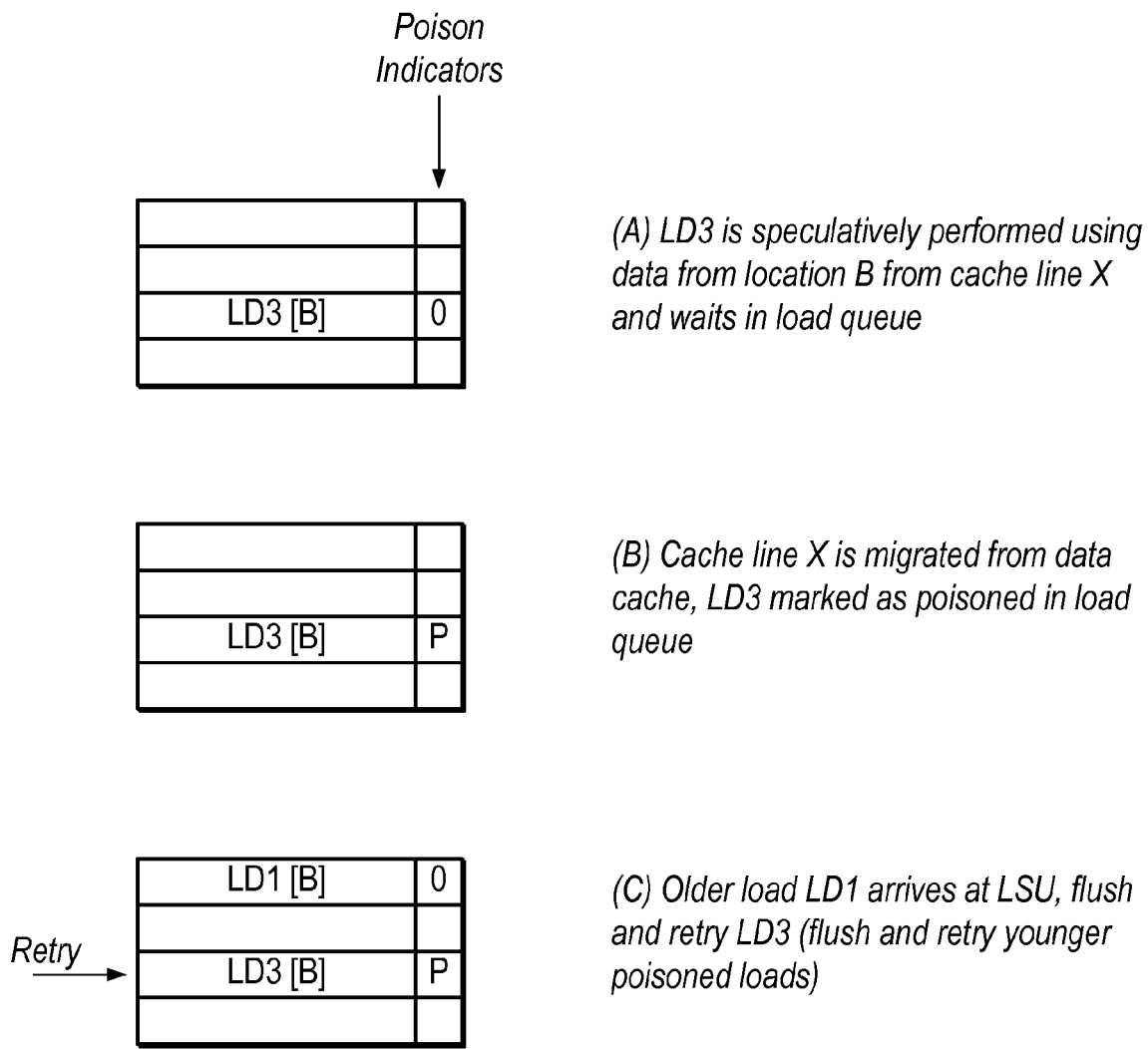
FIG. 1B is a diagram illustrating one embodiment of processing a load instruction.

Referring now to FIG. 1B, a diagram illustrating one embodiment of processing a load instruction is shown. In this embodiment, load queue 110 is configured to store status information for loads in the load queue, including the illustrated "poison" indicators.

At time (A) in FIG. 1B, LSU 155 speculatively performs load instruction LD3 using data from location B in cache line X and stores LD3 in load queue 110. At this point, the poison indicator for LD3 is '0', indicating that LD3 is not poisoned.

Subsequently, at time (B), cache line X is migrated from the data cache. In the illustrated example, LSU 155 marks LD3 as poisoned ('P,' which denotes a "set" poison bit/indicator). In one embodiment, LSU 155 is configured to examine speculatively-executed loads each time a data cache line is migrated in order to mark them as poisoned if they target the cache line. In one embodiment, LSU 155 may include a content addressable memory (CAM) for at least a portion of address fields of loads in load queue 110. LSU 155 may use the CAM to match index and/or tag bits of the address of a load in order to determine if the load targets a migrated cache line.

Subsequently, at point (C), older load LD1 arrives at LSU 155. In response to LD1, in one embodiment, LSU 155 is configured to flush and retry LD3 because it is a younger poisoned load. This may ensure that LD3 does not receive a newer value than LD1 to avoid violation of the load-load ordering rule. In one embodiment, LSU 155 is configured to flush and retry younger poisoned loads (e.g., LD3) whether or not they target the same location as an older load (e.g., LD1).

Figure 1C:
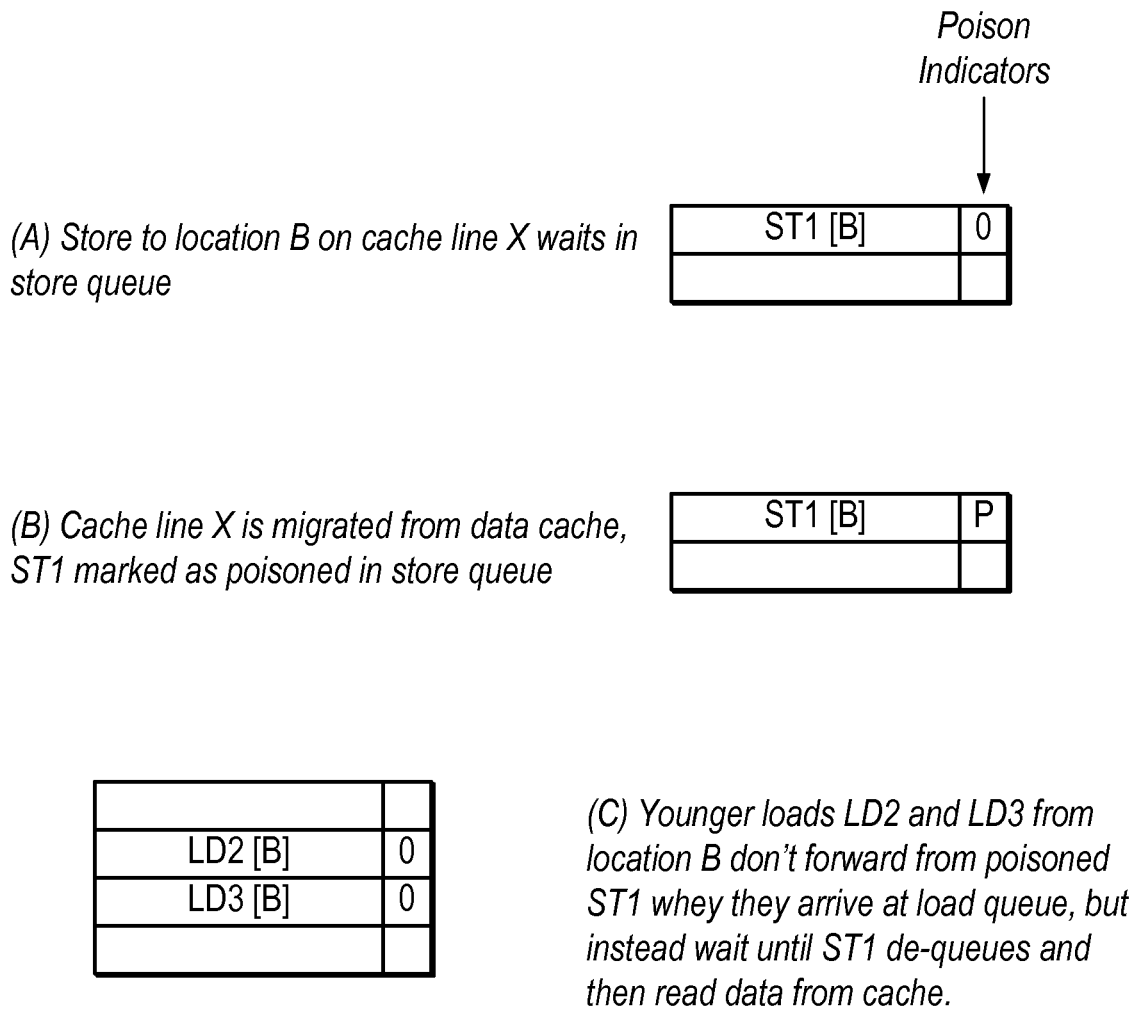
FIG. 1C is a diagram illustrating one embodiment of processing a store instruction.

Referring now to FIG. 1C, a diagram illustrating one embodiment of processing a store instruction is shown. In this embodiment, store queue 120 is configured to store status information for stores including the illustrated "poison" indicators.

At time (A) in FIG. 1C, store instruction ST1 arrives at store queue 120. ST1 targets location B from cache line X. ST1 may be a posted store, i.e., ST1 may be retired from a reorder buffer. At this point, the '0' in ST1's poison indicator denotes that the poison indicator is not set and that ST1 is not poisoned.

Subsequently, at time (B), cache line X is migrated from data cache 175 and LSU 155 responsively marks ST1 is marked as poisoned. In one embodiment, LSU 155 also marks ST1 as a cache miss in response to the migration.

Subsequently, at time (C), younger loads LD2 and LD3 arrive in load queue 110. In one embodiment, younger loads to the same location (B) would normally forward their values from ST1. However, because ST1 is poisoned, in this embodiment LSU 155 is configured to wait to perform LD2 and LD3 until ST1 is removed from store queue 120. Thus, LSU 155 may mark LD2 and LD3 as "waiting" in load queue 110 and may assign them an ID value associated with poisoned ST1. This may ensure that LD2 does not receive a newer value from location B than younger load LD3 (e.g., if LD2 arrived after ST1 was dequeued and read from a cache instead of forwarding from ST1). When ST1 is removed from store queue 120, LSU 155 may perform LD2 and LD3 by reading their data from data cache 175. For example LSU 155 may broadcast the ID value associated with ST1, and waiting loads assigned the ID value may retry based on the ID value.

Note that in some situations and embodiments, LSU 155 may retry a load even when no violation of the load-load ordering rule would have occurred had LSU 155 not retried the load. This may occur, for example, because the targeted cache line is evicted based on a least-recently-used (LRU) scheme and no snoops write to the cache line afterwards until the load would have retired. However, such false retries may be acceptable as a tradeoff for more flexibility in load performance and reducing snoops while still ensuring that the load-load ordering rule is followed. Similarly, waiting for a poisoned store may not always be necessary depending on why a cache line targeted by the store was migrated. For example, if the value of the store ends up being written to the cache line, it may not matter whether loads forward from the store or from the cache line. However, waiting in those situations may be advantageous compared to implementations that do not filter snoops.

Figure 1D:
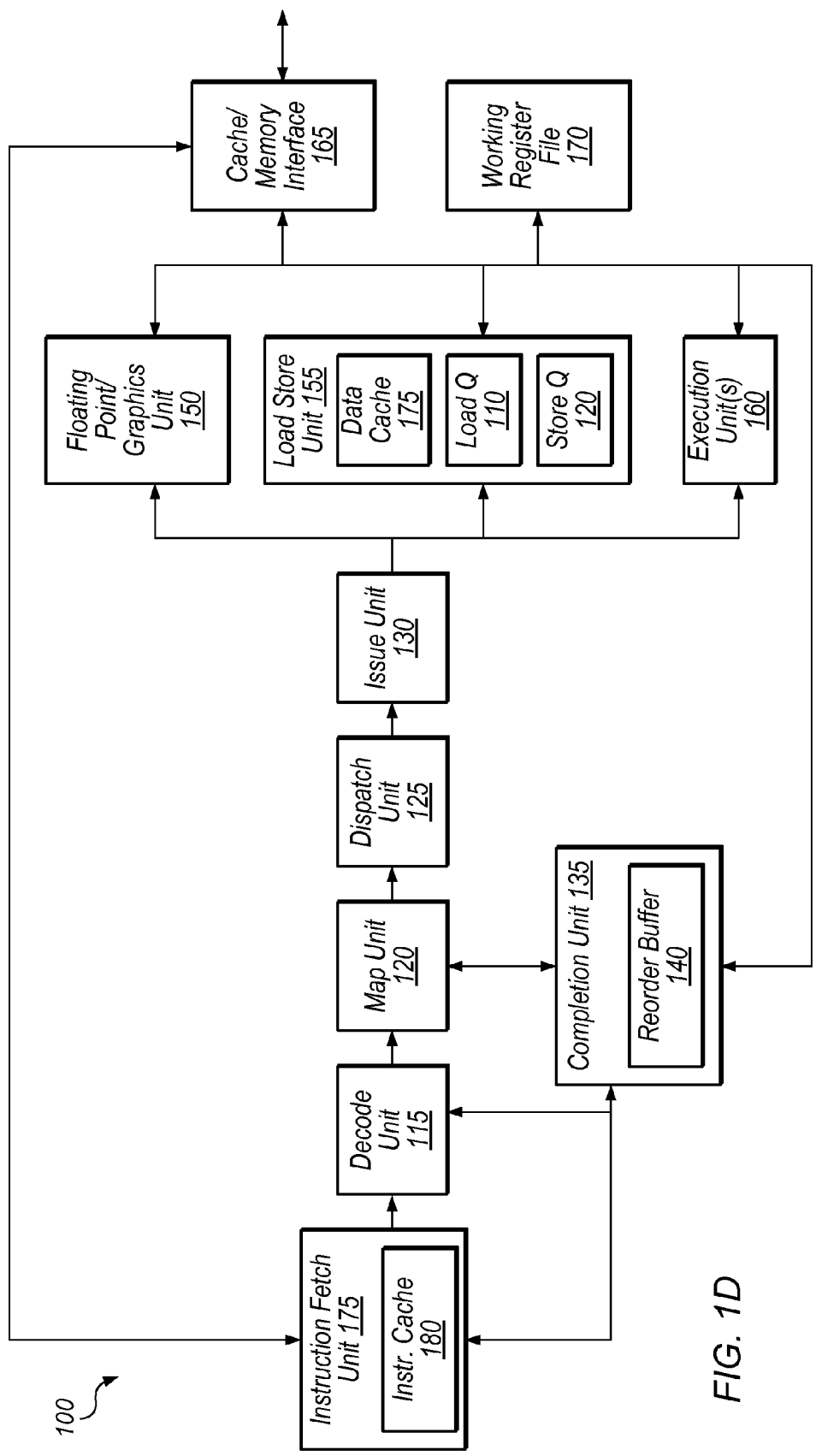
FIG. 1D is a block diagram illustrating one embodiment of a processing pipeline.

Referring now to FIG. 1D, a block diagram illustrating one embodiment of a pipeline of a processor 100 is shown. Processor 100 includes instruction fetch unit (IFU) 175 which includes an instruction cache 180. IFU 175 is coupled to an exemplary instruction processing pipeline that begins with a decode unit 115 and proceeds in turn through map unit 120, dispatch unit 125, and issue unit 130. Issue unit 130 is coupled to issue instructions to any of a number of instruction execution resources including: execution unit(s) 160, load/store unit (LSU) 155, and/or floating-point/graphics unit (FGU) 150. These instruction execution resources are coupled to working register file 170. Additionally, LSU 155 is coupled to cache/memory interface 165. Completion unit 135 is coupled to IFU 175, map unit 120, working register file 170, and the outputs of any number of instruction execution resources.

In the following discussion, exemplary embodiments of each of the structures of the illustrated embodiment of processor 100 are described. However, it is noted that the illustrated embodiment is merely one example of how processor 100 may be implemented. Alternative configurations and variations are possible and contemplated.

Instruction fetch unit 175 may be configured to provide instructions to the rest of the pipeline for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this exemplary situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, IFU 175 is configured to fetch instructions from instruction cache 180 and buffer them for downstream processing, request data from a cache or memory through cache/memory interface 165 in response to instruction cache misses, and predict the direction and target of control transfer instructions (e.g., branches). In some embodiments, IFU 175 may include a number of data structures in addition to instruction cache 180, such as an instruction translation lookaside buffer (ITLB), instruction buffers, and/or structures configured to store state that is relevant to thread selection and processing (in multi-threaded embodiments of processor 100).

In one embodiment, decode unit 115 is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, decode unit 115 may be configured to decode an ISA instruction into one or more micro-operations, which may also be referred to as "instructions" when they specify an operation to be performed by a processor pipeline. Thus, a "load instruction" may or may not be defined by an ISA. A load instruction includes information indicative that a load operation is to be performed and typically includes information indicating a load's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 120 is configured to rename the architectural destination registers specified by instructions of a particular instruction set architecture (ISA) by mapping them to a physical register space, resolving false dependencies in the process. In some embodiments, map unit 120 maintains a mapping table that reflects the relationship between architectural registers and the physical registers to which they are mapped. Map unit 120 may also maintain a "free list" of available (i.e. currently unmapped) physical registers.

Once decoded and renamed, instructions may be ready to be scheduled for performance. In the illustrated embodiment, dispatch unit 125 is configured to schedule (i.e., dispatch) instructions that are ready for performance and send the instructions to issue unit 130. In one embodiment, dispatch unit 125 is configured to maintain a schedule queue that stores a number of decoded and renamed instructions as well as information about the relative age and status of the stored instructions. For example, taking instruction dependency and age information into account, dispatch unit 125 may be configured to pick one or more instructions that are ready for performance.

Issue unit 130 may be configured to provide instruction sources and data to the various execution units for picked (i.e. scheduled or dispatched) instructions. In one embodiment, issue unit 130 includes reservation stations for storing instructions while waiting for their operands and/or for other processing resources to become available. In other embodiments, issue unit 130 provides instructions to reservation stations distributed among FGU 150, LSU 155, execution unit(s) 160, etc. In one embodiment, issue unit 130 is configured to read source operands from the appropriate source, which may vary depending upon the state of the pipeline. For example, if a source operand depends on a prior instruction that is still in the execution pipeline, the operand may be bypassed or forwarded directly from the appropriate execution unit result bus. Results may also be sourced from register files representing architectural (i.e., user-visible) as well as non-architectural state. In the illustrated embodiment, processor 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units, and the execution units may or may not be symmetric in functionality.

LSU 155 may be configured as described above with reference to FIG. 1A. Further, LSU 155 may be configured to process data memory references, such as integer and floating-point load and store instructions and other types of memory reference instructions. In the illustrated embodiment, LSU 155 includes data cache 175, load queue 110, and store queue 120. LSU 155 may be configured to detect misses in data cache 175 and to responsively request data from a cache or memory through cache/memory interface 165. In some embodiments, LSU 155 may implement a hardware prefetcher configured to predict and prefetch data that is likely to be used in the future, in order to increase the likelihood that such data will be resident in a data cache when it is needed.

In some embodiments, load queue 110 and store queue 120 are respectively configured to queue load and store instructions until their results can be committed to the architectural state of the processor. Instructions in the queues may be speculatively performed, non-speculatively performed, or waiting to be performed. Each queue may include a plurality of entries, which may store loads/stores in program order.

In one embodiment, LSU 155 attempts to speculatively perform loads as soon as they arrive. However, LSU 155 may retry speculatively-executed loads based on older conflicting stores and cache line migrations, for example. In some embodiments, LSU 155 may not speculatively execute loads when particular conditions persist when the loads arrive at LSU 155. Such loads may reside in load queue 110 while waiting to be performed.

As used herein, the term "conflict" refers to a situation in which memory access instructions target the same memory location in a particular order. For example, if LD_C and ST_A target the same location, and LD_C arrives at LSU 155 before ST_A, we describe LD_C as conflicting with ST_A. In one embodiment LSU 155 would speculatively perform LD_C and then replay LD_C when ST_A arrives. In another embodiment, LSU 155 would wait to perform LD_C until ST_A arrives. This situation may be referred to as a "read after write" hazard. Other types of conflicts/hazards include "write after read" and "write after write."

In various embodiments, LSU 155 may implement a variety of structures configured to facilitate memory operations. For example, LSU 155 may implement a data TLB to cache virtual data address translations. LSU 155 may also include hardware configured to support atomic load-store instructions, memory-related exception detection, and read and write access to special-purpose registers (e.g., control registers).

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In the illustrated embodiment, completion unit 135 includes reorder buffer (ROB) 140 and coordinates transfer of speculative results into the architectural state of processor 100. Entries in ROB 140 may be allocated in program order. Completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as ready to complete when their results are allowed to be written to the architectural state. Completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying" or "retrying" as used herein, refers to re-performing a speculatively-performed or waiting instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

In one embodiment, completion unit 135 is configured to retire/remove some store instructions from ROB 140 and post them to store queue 120 before the store instructions have actually written their store-data. This may improve processing speed by allowing other instructions to retire instead of waiting for stores to complete. Stores may often complete slowly since they may wait for a write to a cache or memory and may require coherency checks. Posted store instructions may reside in store queue 120 until they have actually written their results (after completion unit 135 has determined that the store instructions have not caused any exceptions and dependencies are resolved). Thus, posted store instructions may not be considered completed until they are removed from store queue 120.

Figure 2:
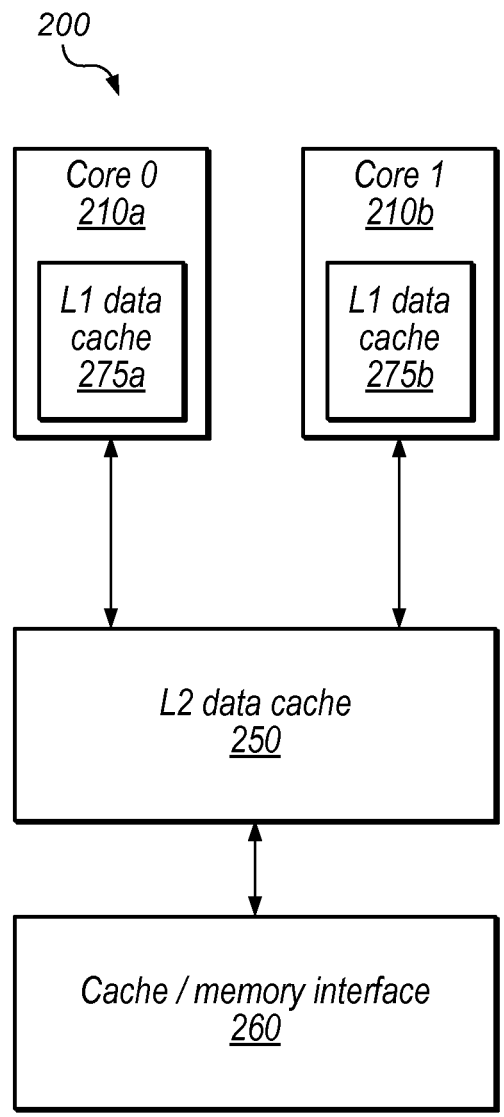
FIG. 2 is a simplified block diagram illustrating one embodiment of a system that includes multiple processing cores.

Referring now to FIG. 2, a simplified block diagram illustrating one embodiment of a system 200 that includes multiple processing cores is shown. In the illustrated embodiment, system 200 includes core 0 210*a*, core 1 210*b*, L2 data cache 250, and cache/memory interface 260. In various embodiments, core 0 and core 1 may reside on the same processor or on different processors. In the illustrated embodiment, core 0 and core 1 share L2 data cache 250.

Core 0 and core 1 may each include a processing pipeline such as the pipeline shown in FIG. 1C and may be configured to execute program instructions of a particular ISA. In the illustrated embodiment, core 0 includes L1 data cache 275*a* and core 1 includes L1 data cache 275*b*.

L2 data cache may implement a coherency unit to maintain coherency among the caches of system 200. For example, when core 1 reads a line from L2 data cache 275, the line may be marked according to a coherency protocol. For example, the line may be marked as exclusive in a MESI scheme (modified, exclusive, shared, invalid) when only core 1 includes the line in its cache. When core 1 writes to a cache line in its cache, it may be marked as modified. In order to write to a cache line, core 1 may "snoop" core 0 to migrate the cache line from core 0 μl data cache 275*a* and maintain coherency.

In other embodiments, various levels and implementations of cache hierarchies may be implemented, with various snooping and coherency mechanisms. For example, in one embodiment core 0 and core 1 may include respective L2 caches and may share an L3 cache. FIG. 2 is intended to illustrate one example embodiment in which store poisoning may be implemented. In some embodiments, L2 data cache 250 is configured to load and store information from a higher-level cache or memory through cache/memory interface 260. In these embodiments, a coherency unit in L2 data cache 250 or elsewhere in system 200 may be configured to maintain coherency between various caches in a cache hierarchy.

In some embodiments, if a load is speculatively executed using data from a cache line in L1 data cache 275*a* and the cache line is subsequently migrated due to a store instruction executed by core 1, the load is marked as poisoned. Similarly, if a store targets a cache line in L1 data cache 275*a* and the cache line is subsequently migrated, the store is marked as poisoned. Further examples of load and store poisoning are described below with reference to FIGS. 4A and 4B.

Referring now to FIG. 3A, a flow diagram illustrating one exemplary embodiment of a method 300 for indicating a poisoned store instruction is shown. The method shown in FIG. 3A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 310.

At block 310, status information is maintained in a store queue. The status information is associated with a store instruction in the store queue that targets a location on a particular cache line. LSU 155 may store the status information along with the store instruction in an entry in the store queue. Flow proceeds to block 310.

At block 320, an indicator is set in the status information in response to migration of the particular cache line. In one embodiment, the indicator is a single poison bit in a store queue entry. The indicator may be usable to sequence execution of younger load instructions, relative to the store instruction. For example, LSU 155 may wait to perform younger load instructions that target the same location as the store instruction when the indicator is set. The indicator may allow LSU 155 to follow the load-load ordering rule while providing flexibility in speculative execution and completion of loads. Flow ends at block 320.

Referring now to FIG. 3B, a flow diagram illustrating one exemplary embodiment of a method 350 for indicating a poisoned load instruction is shown. The method shown in FIG. 3B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 360.

At block 360, a load instruction is speculatively performed using data from a location in a particular cache line. For example, LSU 155 may perform the load instruction as soon as it arrives at LSU 155. LSU 155 may store the load instruction in load queue 110. Flow proceeds to block 370.

At block 370, an indicator is set in status information associated with the load instruction in response to migration of the particular cache line. The status information is maintained in the load queue. The indicator may be usable to retry the load instruction in response to an older load instruction. LSU 155 may flush and retry the load instruction in response to receiving an older load instruction. The indicator may allow LSU 155 to follow the load-load ordering rule while providing flexibility in speculative execution and completion of loads and allowing snoop filtering. Flow ends at block 370.

FIG. 4A illustrates exemplary processing of load and store instructions. In the illustrated example, processor core 0 executes instructions ST1, LD2, and LD3. ST1 is older than LD2, which is older than LD3, which is older than ST6. Processor core 1 executes ST6. Core 0 and core 1 may reside on the same processor or on different processors. In the illustrated example, core 0 and core 1 are each configured to execute load and store instructions out of program order and each include a respective data cache, similarly to the cores 210 of FIG. 2.

Example load-load rule violation 410 provides a sequence of steps that violate the rule when a poison indicator is not used. First, the ST1 instruction writes old data to location B in cache line X of the core 0 data cache. The data is "old" with respect to the data to be written to location B by younger instruction ST6. ST1 then waits in the store queue (of core 0). Subsequently, core 0 data cache line X is migrated (e.g., evicted based on an LRU policy). Subsequently, ST6 writes "new" data to core 1 data cache line X (note that core 0 cache line X may remain evicted/invalidated at this point). In one embodiment, because core 0 no longer contains cache line X, a snoop from core 1 based on ST6 is filtered and does not reach core 0. Subsequently, LSU 155 brings cache line X with the data from ST6 into the core 0 data cache. Subsequently, LSU 155 speculatively performs LD3 by reading old data from ST1 (i.e., LSU 155 does not read the new value from the data cache, but forwards data directly from ST1 in the store queue). Subsequently, ST1 dequeues, and LSU 155 performs LD2. LD2 reads the new ST6 data from the core 0 data cache. This violates the load-load ordering rule because an older load (LD2) reads newer data than a younger load (LD3) from the same location (location B).

Solution 420 illustrates how use of a poison indicator can solve the problem of example 410 for the same order of instruction performance. Even though instructions are performed in the same order, the poison indicator prevents violation of the load-load rule. Execution proceeds similarly to example 410 until core 0 data cache line X is evicted. At that point, LSU 155 marks ST1 as poisoned based on the migration of cache line X. Thus, instead of speculatively performing LD3 by forwarding data from ST1, LSU 155 wait to perform LD3 until after ST1 dequeues because of ST1's poison indicator. Thus, once ST1 dequeues, both LD2 and LD3 read new data from the core 0 data cache and the load-load ordering rule is not violated.

FIG. 4B illustrates another example of processing load and store instructions. In the example of FIG. 4B, core 0 and core 1 perform the same instructions as described above with reference to FIG. 4A, but in a different order. In the example of FIG. 4B, LSU 155 speculatively performs LD3 before migration of cache line X (and thus before setting the ST1 poison indicator). This causes the same problem in example violation 430 as that of example 410 because the LD3 reads older data than younger LD2. But, in solution 440, the ST1 poison bit does not help LD3: it has already been speculatively executed. Instead, LD3 is itself marked as poisoned due to migration of cache line X.

Thus, in solution 440, performance of LD2 causes LSU 155 to flush and retry younger poisoned loads as described above with reference to FIG. 1B. In solution 440, LSU 155 eventually retries LD3 by reading the new ST6 data from the core 0 data cache. Because both LD2 and LD3 get the new data, the load-load ordering rule is not violated.

Note that because ST1 is also marked as poisoned, if LD2 were to arrive before ST1 dequeued, LSU 155 is configured wait to perform LD2 until ST1 dequeues as described above with reference to FIG. 1C. FIGS. 4A and 4B show that with poison bits for both loads and stores, the load-load ordering rule can be followed regardless of the timing of execution of loads and stores with respect to migration of a cache line.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a cache having a plurality of cache lines; and
   a store queue configured to maintain status information for store instructions that target locations in ones of the plurality of cache lines;

wherein the processor is configured to set an indicator in the status information for a particular store instruction in the store queue in response to migration of a cache line targeted by the particular store instruction; and wherein the indicator is usable to sequence performance of load instructions that are younger than the particular store instruction.

2. The processor of claim 1, wherein the processor is further configured to:

wait, based on the indicator, to perform a load instruction until the particular store instruction is removed from the store queue, wherein the load instruction is younger than the particular store instruction and wherein the load instruction targets the location.

3. The processor of claim 2, wherein the processor is further configured to:

before setting the indicator, receive a different younger load instruction, wherein the different younger load instruction targets the location; and speculatively perform the different younger load instruction using data forwarded from the particular store instruction.

4. The processor of claim 1, wherein the processor is configured to filter snoops sent to a pipeline executing the particular store instruction by forwarding only snoops that target a cache line that is currently in the cache.

5. The processor of claim 1, wherein the processor is further configured to:

replay one or more load instructions in a load queue that conflict with the particular store instruction in response to receiving the store instruction.

6. The processor of claim 1, further comprising:

a coherency unit configured to migrate the cache line in order to maintain coherency between a plurality of processing cores.

7. The processor of claim 1, wherein the migration is an invalidation of the cache line.

8. The processor of claim 1, wherein the migration is an eviction of the cache line.

9. A method, comprising:

maintaining status information in a store queue, wherein the status information is for a store instruction in the store queue that targets a location of a particular cache line; and setting an indicator in the status information for the store instruction in response to migration of the particular cache line;

wherein the indicator is usable to sequence performance of load instructions that are younger than the store instruction.

10. The method of claim 9, further comprising:

waiting for performing a load instruction that is younger than the store instruction until the store instruction is removed from the store queue, wherein the load instruction targets the location; and performing the load instruction using data from the particular cache line after the store instruction is removed from the store queue.

11. The method of claim 10, further comprising:

before the setting, receiving a different younger load instruction, wherein the different younger load instruction targets the location; and speculatively performing the different younger load instruction using store-data from the store instruction.

12. The method of claim 9, further comprising:

filtering a snoop that targets the particular cache line, wherein the filtering includes forwarding the snoop only to caches that store the particular cache line.

13. The method of claim 9, further comprising:

receiving the store instruction, before setting the indicator; and replaying one or more load instructions in a load queue that are younger than the store instruction and that target the same address as the store instruction.

14. The method of claim 9, wherein the maintaining and the setting are performed by a load/store unit.

15. A processor, comprising:

a cache having a plurality of cache lines;

a load queue configured to maintain status information for a load instruction that targets a location in one of the plurality of cache lines;

wherein the processor is configured to set an indicator in the status information for the load instruction in response to migration of the one of the plurality of cache lines; and wherein the indicator is usable to sequence performance of the load instruction and one or more other instructions.

16. The processor of claim 15, wherein the processor is configured to flush and retry the load instruction in response to an older load instruction that arrives when the indicator is set.

17. The processor of claim 15, further comprising:

a store queue, configured to maintain store status information associated with a store instruction that targets a location in the one of the plurality of cache lines;

wherein the processor is configured to set an indicator in the store status information in response to the migration of the one of the plurality of cache lines.

18. The processor of claim 17, wherein the processor is configured to wait to perform a different load instruction until the store instruction is removed from the store queue, wherein the processor is configured to wait based on the indicator in the store status information.

19. The processor of claim 15, wherein migration of the cache line is caused by a snoop operation that targets the cache line and is initiated by a different processor pipeline than a processor pipeline executing the load instruction.

20. The processor of claim 15, wherein the processor is configured to filter snoops sent to a pipeline executing the load instruction by forwarding only snoops that target a cache line that is currently in the cache.

* * * * *